Oct. 30, 1962 L. L. SUTTON 3,061,121
LOG HANDLING SYSTEM
Filed May 8, 1959 3 Sheets-Sheet 1
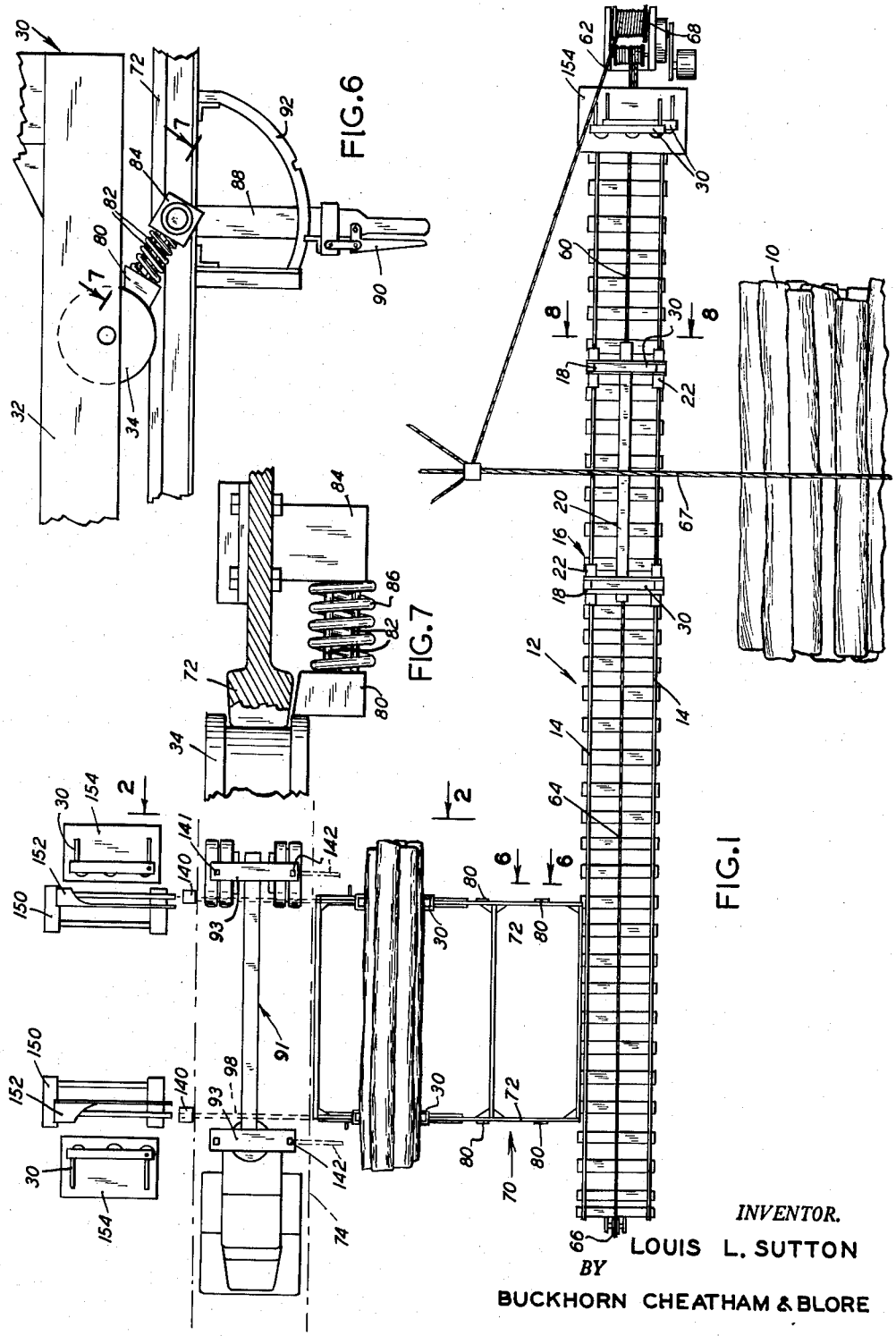
INVENTOR.
LOUIS L. SUTTON
BY
BUCKHORN CHEATHAM & BLORE
ATTORNEYS Oct. 30, 1962  L. L. SUTTON  3,061,121
LOG HANDLING SYSTEM
Filed May 8, 1959  3 Sheets-Sheet 2
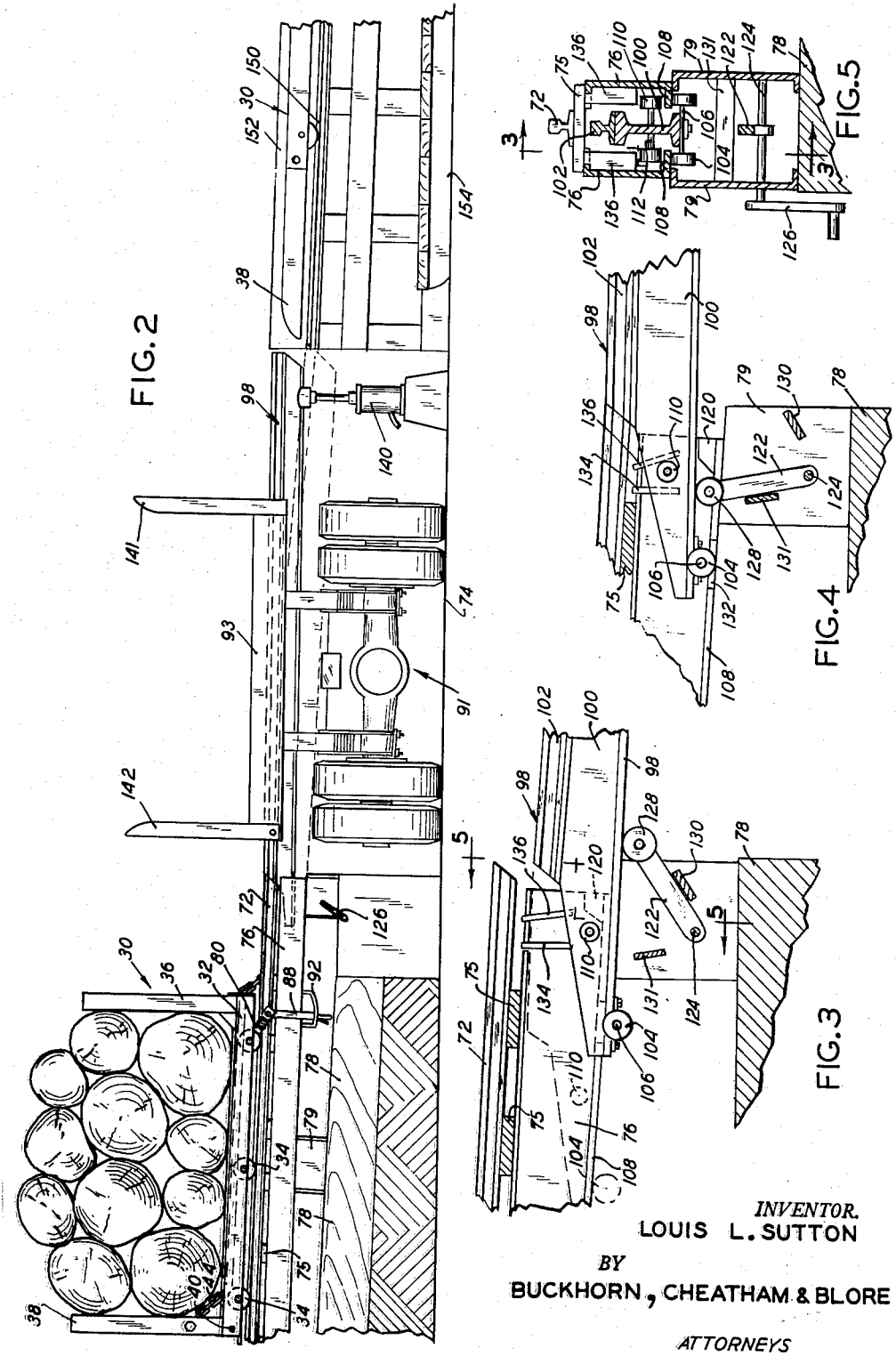
INVENTOR.
LOUIS L. SUTTON
BY
BUCKHORN, CHEATHAM & BLORE
ATTORNEYS

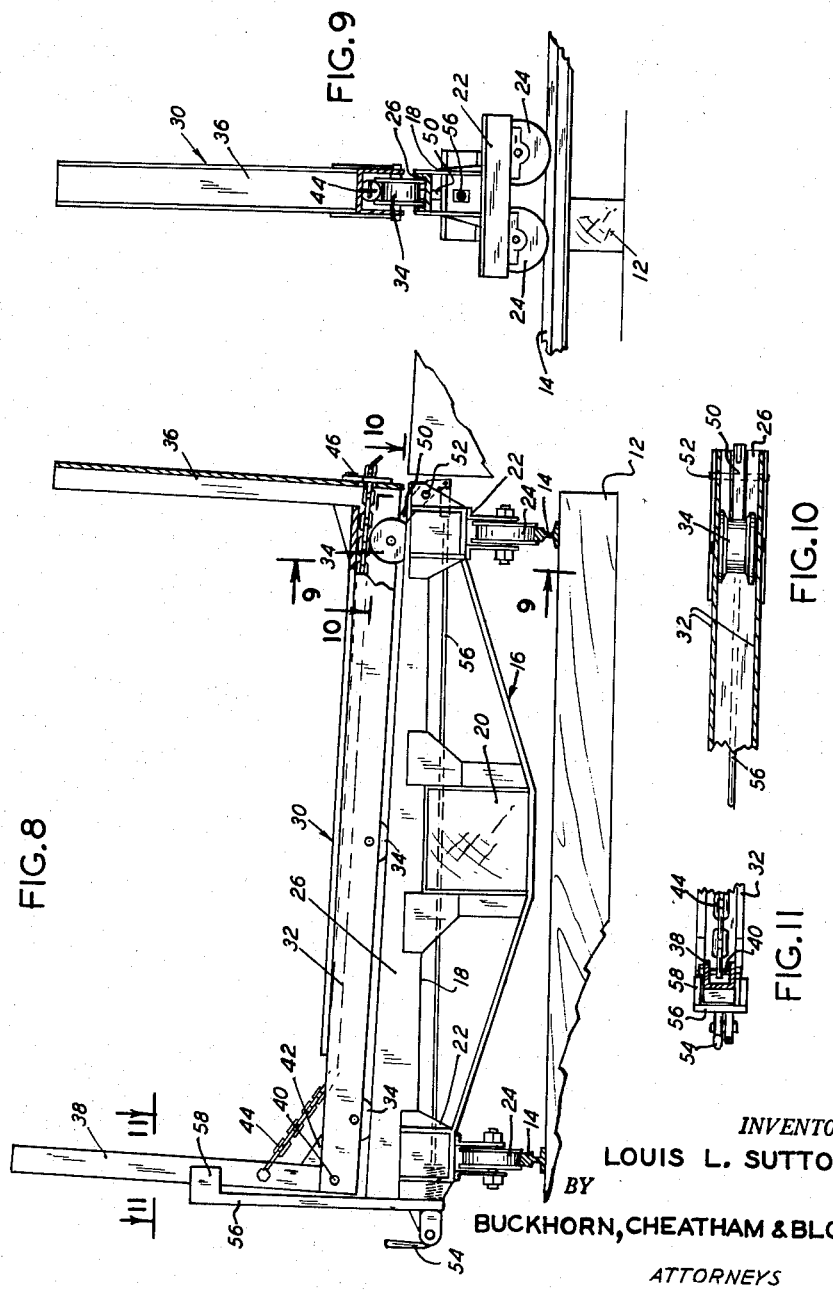

United States Patent Office 3,061,121
Patented Oct. 30, 1962

3,061,121
LOG HANDLING SYSTEM
Louis L. Sutton, 7037 N. St. Louis St., Portland, Oreg.
Filed May 8, 1959, Ser. No. 811,891
4 Claims. (Cl. 214—41)

The present invention relates to a log handling system and more particularly to a system for temporarily storing and subsequently loading logs upon vehicles for transporting the same.

The conventional logging procedure in the big timber region on the west coast is to fell the trees and thereafter drag or haul the individual logs cut from the threes to a loading area at which the logs are loaded upon trucks for transportation to lumber mills. Operators are plagued by the fact, and the small operator in particular, that they can usually bring logs to the loading area much faster than the logs can be loaded and hauled by trucks to the mill except where an extraordinarily large fleet of trucks is utilized. The size of the capital investment needed to maintain an adequate fleet of trucks to keep the logs moving continually at all times is, in most cases, prohibitive. The result is that the logging operation frequently has to be stopped or slowed down because the trucking cannot keep up with the rate at which logs can be brought in. At the same time, logs can be trucked generally for twenty-four hours a day while felling operations can be carried out only during the daylight hours. Also, trucking can sometimes be continued when the weather otherwise prohibits the logging operations to be continued.

It is a principal object of the present invention to provide a system of handling logs at the loading area which will minimize the difficulties enumerated above.

More particularly, and as will be explained in detail hereinafter, the present invention pertains to a system wherein logs are loaded onto bunks which can be positioned on a storage platform and from which the logs can be transferred to log trucks without the need of operating the usual heavy duty loading equipment.

In particular, the present invention has for an object the provision of a system which will permit trucking operations to continue throughout a twenty-four hour day with a minimum of manpower and without hampering the handling of logs at the loading operation.

Other important objects and advantages of the invention will become more apparent from the following description thereof taken in conjunction with the accompanying drawings wherein:

FIG. 1 is a plan view of the logging system incorporating the invention;

FIG. 2 is an elevation of a portion of the system as viewed in the direction of the arrows 2—2 of FIG. 1;

FIG. 3 is a sectional view of a portion of the equipment taken substantially along the line 3—3 of FIG. 5;

FIG. 4 is a view similar to FIG. 3 showing another operative condition of the apparatus illustrated in FIG. 3;

FIG. 5 is a sectional view taken substantially along line 5—5 of FIG. 3;

FIG. 6 is an enlarged view of a portion of the apparatus used in the system of the invention looking in the direction of the arrows 6—6 of FIG. 1;

FIG. 7 is an enlarged sectional view taken substantially along line 7—7 of FIG. 6;

FIG. 8 is a view taken along line 8—8 of FIG. 1 showing details of the log carriage and long storage bunks utilized in the system of the invention;

FIG. 9 is a sectional view taken substantially along line 9—9 of FIG. 8;

FIG. 10 is a sectional view taken substantially along line 10—10 of FIG. 8; and

FIG. 11 is a sectional view taken substantially along line 11—11 of FIG. 8.

With reference now to the drawings, logs to be handled in the system of the invention will be dragged or otherwise transported to a landing area and preferably will be positioned in a stack or cold deck, such as indicated at 10 in FIG. 1, alongside of a trackway 12 having a pair of parallel rails 14. Running on the rails 14 is a carriage 16 including a pair of opposite transverse end members 18 connected by a reach 20. The end members 18 are supported by trucks 22 including wheels 24 riding upon the rails 14. As most clearly shown in FIG. 8, the end members 18 preferably are inclined transversely of the carriage 16 and trackway 12 so as to slant downwardly toward one side thereof and as most clearly shown in FIG. 9, the upper edge of each of the end members is formed as an upwardly facing channel defining track means in which may be supported log bunks 30.

With more particular reference to FIGS. 8 and 9, the log bunks 30 each comprise an elongate base member 32 which is supported by a plurality of wheels 34 for movement of the base member in the longitudinal direction thereof. As most clearly shown in FIG. 9, the wheels 34 are adapted to ride within the track or channel 26 so as to support the log bunks thereon. The log bunks 30 are each provided with a fixed upright 36 at one end of the base member thereof. Pivotally mounted upon the other end of the base member 32 is a second upright 38 which may be swung between an upright position and a lowered position in which the upright is parallel to the base member as indicated in FIG. 2, the pivtoal connection being indicated at 40. Means are provided for releasably locking the upright 38 in upright position including a stop 42 against which the upright is held in abutting position by a chain 44 extending from the upright through the base member 32 to the opposite end of the bunk at which it is secured by a suitable releasable keeper arrangement, such as a simple fit hook indicated at 46.

As will be evident from FIG. 8, the log bunks will tend to roll off the downward side side of the carriage end members 18. To secure the log bunks upon the carriage, releasable stop means are provided including a stop 50 pivotally mounted at 52 upon the track 26 of each of the end members 18 for movement between an elevated position in which it will abut against a wheel 34 of the log bunk and a lowered position beneath the track 26. The stop 50 is operated by an overcenter lever 54 mounted on the opposite or uphill side of the carriage and connected to the stop 50 by a connecting element 56.

To support the log bunks with the uprights in vertical position with the log bunks are initially positioned upon the carriage end members 18, a bracket member 56 is provided on the uphill side of the carriage, and which bracket includes a U-shaped element 58 at its upper end which will straddle the upright 38 to retain it in vertical position as shown in the drawings. Logs from the stack 10 may be loaded onto the bunks 30 by any suitable means.

The suspending cable 67 of a suspension type loader is indicated in FIG. 1 and which may be powered from a drum 68 of a winch 62.

Suitable means are provided for moving the carriage 16 along the trackway 12. In the illustrated embodiment, the carriage 16 may be pulled along the trackway 12 by a cable 60 extending between the winch 62 and one end of the carriage and a second cable 64 extending from the opposite end of the carriage and reeved about a pulley 66 at the opposite end of the trackway and extending back to the winch 62.

The carriage 16 is adapted to be moved along the trackway 12 between a loading position opposite the cold deck or loading area 10 and a storage platform positioned at some remote location and indicated generally in the drawings at 70. The storage platform 70 comprises a pair of rails 72 which extend at right angles to the direction of the trackway 12. The ends of the rails 72 adjacent the trackway are positioned the same distance apart as the tracks 26 of the carriage 16 and are of the same elevation and immediately adjacent the position of the carriage when it is adjacent the storage platform so that the log bunks 30 can be rolled from the carriage tracks 26 onto the rails 72. Preferably, the rails 72 are inclined downwardly at a slight angle from the trackway 12 toward a roadway 74 indicated by dotted lines in FIG. 1. The platform 70 may be of any desired length and is preferably of such a length such as to enable the positioning and storage thereon of several log bunks in a fashion to be explained subsequently. The rails 72 are supported in any suitable fashion as by pads 75 upon a pair of opposite channel members 76 (see FIG. 5) mounted with their flanges extending toward one another. The channel members 76 are supported at suitable intervals upon a base member or foundation 78 by elements 79 which define a channel beneath the channel members 76 for a purpose to be made apparent.

Stop means are provided at suitable intervals along the rails 72 for engaging the wheels 34 of log bunks supported on the rails so as to hold the log bunks in the desired positions along the rails. Referring to FIGS. 2, 6 and 7, the illustrated stop means includes a stop block 80 slidably mounted on rods 82 extending from a pivot block 84 and around which rods a snubber spring 86 is provided. The stop block 80 can be swung from the elevated stopping position as shown in FIG. 6 to a lowered position beside the track 72 by suitable means such as an operating lever 88 having catch means 90 for engaging in notches within a guide 92 to hold the stop in either its snubbing or inoperative position.

The roadway 74 is of such an elevation relative to the end of the platform 70 adjacent thereto as to position a logging truck 91 on the roadway with the bed 93 of the truck slightly below the adjacent ends of the rails 72. Cooperatively arranged with each of the rails 72 is an extension rail which is mounted for movement between a retracted position out of said roadway and an operative position extending from and in alignment with the corresponding platform rail 72 so as to permit log storage bunks 30 to be moved from the storage platform 70 to a position over the logging truck 91 on the roadway 74. With particular reference now to FIGS. 2 to 5, inclusive, associated with each of the rails 72 is an extensible rail member 98 including an I-beam 100 upon which is mounted a rail 102. Each rail member 98 is slidable between and longitudinally of a pair of the channel members 76 and beneath the rail 72 mounted thereon. Supporting each of the rail members 98 for extensible movement thereof is a pair of rollers 104 mounted on the opposite ends of an axle 106 suitably secured to the lower portion of the I-beam 100 with the rollers 104 adapted to engage and roll beneath the lower flanges 108 of the channel members 76. A second pair of rollers 110 is rotatably mounted on an axle 112 extending through the flange of the I-beam 100 near the end adjacent for which the roller 104 is mounted but in the direction toward the longitudinal center of the I-beam 100. The rollers 110 engage upon the upper surface of the flanges 108 so as to support the rail member 98 in cantilever fashion from the channel member 76 as the rail member moves outwardly over the roadway 74.

Means are provided for raising the rail member 98 after it has been extended so as to bring the rail 102 in alignment with the rail 72. Referring to FIGS. 2 to 5, inclusive, there is provided on each of the flanges 108 an abutment or stop 120 to engage the rollers 110 when the rail member 98 is moved to its extended position. Cam means are provided to elevate the rail member 98 when it is in this position to wedge the rails 102 and 72 into snug engagement. Mounted between the supporting elements 79 is an arm 122 secured to a shaft 124 journaled in the elements 79 and extending outwardly of one side thereof and to which shaft is fixed an operating means, such as an operating handle 126. The free end of the arm 122 is provided with a roller 128 upon which rests the lower flange of the I-beam 100 as the rail member 98 is extended and as best shown in FIG. 3. In this position, the arm 122 is supported by a rest 130 secured to and extending between the elements 79. When the rail member 98 is brought to its extended position, the handle 126 is operated to swing the arm 122 upwardly to an over center position against a stop or rest 131, as shown in FIG. 4, which causes the rail member 98 to be moved upwardly. To permit such movement, the flanges 108 of the channel member 76 are cut away as indicated at 132 to provide clearance for the rollers 104 and preferably guide means comprising plates 134, 136 are provided on each of the channel members 76 to engage the rollers 110 and wedge the rail end 102 snugly against the end of the rail 72. To assist in snug engagement between the rails, the adjacent ends preferably are beveled as shown in FIGS. 3 and 4.

Means are provided to lower the extension rails 98 when they are extended over the roadway. As best shown in FIG. 2, a hydraulic jack 140 is provided on the side of the roadway 74 opposite the storage platform 70 for each of the rail members 72. The jacks 140 are operable to maintain the rail members 98 in substantially horizontal position as indicated in solid lines in FIG. 2 or to be lowered so as to move the rail members 98 to an inclined position as indicated in dotted lines in FIG. 2. During movement of a rail member 98 between such positions, it may pivot about the rollers 128 as is best apparent from FIG. 4.

Positioned on the side of the roadway 74 opposite the storage platform 70 are a pair of log bunk receiving platforms 150 onto which the log bunks 30 may roll from the rail extension members 98. Preferably, each of the platforms 150 is provided with a shear 152 (see FIG. 1) which will cause the log bunks rolling thereon to be flipped to one side of the platforms so that they may fall upon skids 154 upon which the bunks may be returned to the loading station for the carriage 16 and as shown in FIG. 1.

*Operation*

The system of the invention is operated in the following sequence. The carriage 16 is positioned at the loading station opposite the log pile 10 and a pair of log bunks 30 positioned and locked on the opposite end members 18 of the carriage with the uprights 36, 38 of the log bunks in their upright position. A load of logs is then placed upon the log bunks 30 and the carriage 16 moved down the trackway 12 to a position opposite the storage platform 70. When this position has been reached, the levers 54 on the carriage 16 are operated to release the stops 50 which will permit the log bunks 30 and the load of logs carried thereby to roll from the carriage 16 onto the rails 72 of the storage platform and on which they will roll until they engage the first set of stops 80 which will arrest their movement. The carriage 16 can then be returned to its loading position and another set of bunks 30 positioned on the carriage and loaded as before after which the carriage is again moved to a position opposite the storage platform 70 and the stops 50 released to permit the bunks to roll onto the storage platform. In the meantime, the first set of bunks 30 and the load carried thereon are permitted to roll down the storage platform by releasing the sets of stops 80 in series until the bunks come to a rest in a position immediately adjacent the end of the storage platform 70 adjacent the roadway 74. As many sets of bunks and loads of logs may be positioned on the storage platform 70 as may be desired and as may be accommodated by the storage platform which obviously can be of any desired length. When it is desired to position a load of logs upon a truck 91, the truck is driven on the roadway 74 into a position opposite the end of the storage platform as shown in FIGS. 2 and 3. The extension rails 98 are then manually extended across the roadway 74 and the jacks 140 and the cam means 122—128 operated to elevate the rail member into a horizontal position in alignment with the rails 72.

Preferably, the truck 91 is provided with stakes 141, 142 on each of its opposite sides and preferably the stakes 142 on the side of the truck adjacent the storage platform 70 are either pivotally mounted as indicated in FIG. 2 or removable so that they can be moved out of the way to permit a set of log bunks and the load thereon to be moved on the rail members 98 over the bed 93 of the truck. This is done by simply releasing the stops 80 holding the log bunks 30 which are adjacent the end of the platform 70 so that they may roll off of the rails 72 onto the extension rail members 98. The momentum of the bunks 30 and their load will carry them until the load of logs engages the stakes 141 on the opposite side of the truck whereupon the movement will be stopped. Thereafter, the stake 142 may be repositioned upon the truck. Obviously, the truck bed 93 must be of a predetermined elevation such that when the logs are supported on the bunks 30 on the extension rails 98, the logs will be above the truck bed. After the stakes 142 have been repositioned on the truck 91, the jacks 140 are operated to lower the extension rail members 98. This will in turn lower the log bunks and the logs carried thereon so that the logs will be brought to rest upon the truck bed 93 and be supported thereby. Thereafter, the fit hooks 46 are pulled on the log bunks 30 to release the uprights 38 which will fall to their horizontal position permitting the log bunks to roll downwardly along the extension rails 98 beneath the logs which are now supported on the bed 93 of the truck. The bunks will roll onto the platform 150 until the shear 152 is engaged and which will then cause the bunks to be tipped over so that they may fall upon the skids 154 and returned to the loading station.

As will be apparent, a number of sets of bunks 30 could be loaded and stored upon the storage platform 70. Thereafter, the logs could be loaded onto trucks 91 as desired. Thus, the loading operation can be operated more or less independently of the trucking operation enabling more efficient overall operation.

The trucks can be unloaded by reversing the loading operation. That is, at an unloading station, such as at a sawmill, storage bunks could be run beneath the load and then elevated to take up the logs and carry them off the truck to one side thereof. The logs could be stored on the storage bunks and moved thereon directly to the heading of the mill and the logs lifted from the bunks directly onto the carriage.

Having illustrated and described a preferred embodiment of the invention, it should be apparent to those skilled in the art that the invention permits of modification in arrangement and details. I claim as my invention all such modifications as come within the true spirit and scope of the appended claims.

I claim:

1. In a system for handling and loading logs, a storage platform comprising a pair of parallel rails for supporting wheeled log bunks, a roadway adjacent one end of said storage platform for a log truck having a bed of predetermined height, a pair of extensible rail means, cooperative means on said extensible rail means and said rails for supporting said rail means beneath said rails in a retracted position, said means permitting said extensible rail means to be withdrawn from beneath said rails and extended over said roadway, cam means operatively arranged between said rails and said rail means for moving said rail means into alignment with said rails, jack means on the opposite side of said roadway for supporting the opposite ends of said extensible rail means, said jack means being operable to support said rail means between a first elevated position of predetermined elevation over said roadway and a second predetermined lower elevation over said roadway.

2. In a system for handling and loading logs onto a log truck, a storage platform comprising a pair of rails for supporting wheeled log bunks having a load of logs thereupon, a roadway adjacent one end of said platform, said rails being inclined downwardly on said platform toward said roadway, releasable stop means on said platform for releasably holding a pair of loaded log bunks thereon, extensible rail means for providing an extension of said rail means over said roadway, means pivotally mounted on said extensible rail means at the ends thereof adjacent said rails when in the extended position, and jack means supporting said extensible rail means on the opposite side of said roadway for movement between an elevated horizontal position and a lower inclined position wherein extensible rail means are inclined downwardly from said platform.

3. In a system for handling and loading logs onto a log truck, a storage platform comprising a pair of rails for supporting wheeled log bunks having a load of logs thereupon, a roadway adjacent one end of said platform, said rails being inclined downwardly on said platform toward said roadway, releasable stop means on said platform for releasably holding a pair of loaded log bunks thereon, extensible rail means cooperatively arranged with said rails for providing an extension of said rails over said roadway, means pivotally mounting said extensible rail means at the ends thereof adjacent said rails when in the extended position, jack means supporting said extensible rail means on the opposite side of said roadway for movement between an elevated horizontal position and a lower inclined position wherein extensible rail means are inclined downwardly from said platform, and means on the side of said roadway opposite said storage platform for receiving said log bunks after deposit of the load carried by said log bunks on a truck positioned in said roadway.

4. In combination, a rail structure including a pair of flanged channel members mounted in parallel opposed relation with their flanges extending toward one another, a fixed rail mounted on and extending parallel to said channel members, an extensible rail member for extension from one end of said fixed rail and including an I-beam and a second rail mounted thereon, said rail member being slidable between and longitudinally of said channel members beneath said fixed rail, a first pair of rollers rotatably mounted adjacent the end of said I-beam inwardly of said fixed rail end and engaged beneath the lower flanges of said channel members, a second pair of rollers rotatably mounted on said I-beam adjacent said one end but spaced from said first pair of rollers toward the longitudinal center of said I-beam, said second pair of rollers engaging the upper side of said lower flanges to support said rail member in cantilever fashion from said channel members as said rail member is moved outwardly from beneath said rail one end, and cam means operable to elevate said rail member to bring said fixed rail end and said second rail into alignment when said second rail is withdrawn from beneath said fixed rail.

References Cited in the file of this patent

UNITED STATES PATENTS

| | | |
|---|---|---|
| 602,395 | Emerson | Apr. 12, 1898 |
| 1,040,229 | McCune | Oct. 1, 1912 |
| 1,557,195 | Clapp | Oct. 13, 1925 |
| 1,783,363 | Grob | Dec. 2, 1930 |
| 1,800,155 | Romine | Apr. 7, 1931 |
| 2,107,292 | Fitch | Feb. 8, 1938 |
| 2,147,522 | Byington | Feb. 14, 1939 |
| 2,342,344 | Hunter | Feb. 22, 1944 |
| 2,467,354 | Baldwin | Apr. 12, 1949 |
| 2,627,959 | Seward | Feb. 10, 1953 |
| 2,700,552 | Query | Jan. 25, 1955 |
| 2,732,958 | Bonanno | Jan. 31, 1956 |

FOREIGN PATENTS

| | | |
|---|---|---|
| 318,952 | Great Britain | Sept. 13, 1929 |